United States Patent Office 3,579,613
Patented May 18, 1971

3,579,613
POLYSALTS CONTAINING SULFONATED ACRYLICS
Raymond J. Schaper, Pittsburgh, and Merwin Frederick Hoover, Bethel Park, Pa., assignors to Calgon Corporation
No Drawing. Filed Nov. 16, 1967, Ser. No. 683,467
Int. Cl. C08f 29/50, 33/08
U.S. Cl. 260—901
3 Claims

ABSTRACT OF THE DISCLOSURE

Poly(sulfonated acrylics) are reacted with various cationic polymers to form polysalts.

BACKGROUND OF THE INVENTION

This invention relates to plastic or solid gel compositions formed of two ionically cross-linked synthetic organic linear polymers. One of the polymers is predominantly anionic and the other of the polymers is predominantly cationic. Such compositions are useful in making plastic or gel solid membranes and moldable masses.

In United States Patent 3,271,496 issued to Michaels, several examples are presented of ionically cross-linked polyelectrolyte polymers. Specifically, the patent discloses the reaction of sodium polystyrene sulfonate with polyvinyl benzyl trimethyl ammonium chloride. Such a composition, which is ionically cross-linked, is shown to be thermoplastic. In U.S. Patent 3,276,598 Michaels and Miekka disclose the manufacture of a dialysis membrane which is anionically cross-linked polysalt of the two polymers above mentioned, namely vinyl benzyl trimethyl ammonium chloride and sodium polystyrene sulfonate. The dialysis membrane is made by the reaction at the interface of solutions of each polymer.

SUMMARY OF THE INVENTION

We have found that anionic polymers containing units of the following configuration

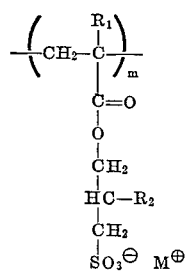

where $R_1$ is H, $CH_3$ or $C_2H_5$, $R_2$ is H or OH, and $m$ is at least 100, may be used to react with various cationic polymers to form polysalts. See U.S. Pat. No. 2,964,557 and U.S. patent application Ser. No. 631,875 of Raymond J. Schaper filed Apr. 19, 1967. In the above formula the cations show as $M^\oplus$ may be independently selected monovalent cations.

Although we may employ any cationic polymer, we prefer to use polyvinyl pyridine quaternary ammonium polymers, polyvinyl benzyl trimethyl ammonium chloride, quaternized polyethylene amines, poly(dimethyl amino ethyl methacrylate quaternary ammonium compounds), poly (dimethyl diallyl ammonium chloride), poly (2-hydroxy-3-methacryloyloxy-propyl trimethyl ammonium chloride) (see U.S. Pat. No. 3,245,939), and poly (methyl dodecyl diallyl ammonium chloride). Our compositions are useful in making membranes and moldable masses.

The anionic and cationic polymers are reacted in dissolved form. Typically, a solution of anionic polymer is brought into contact with a solution of cationic polymer, forming a precipitate or coagulated mass at the interface, after which no further solution passes either way. In this manner, a porous membrane may be formed. Alternately, a solution of one type of polymer may be added slowly to a solution of the other type under agitation. This process will not form a membrane but rather a gelatinous mass or precipitate which can be filtered, dried and used as such.

We prefer to use solutions of 1–10% by weight of each polymer.

We prefer to use the sodium salt in the case of the anionic polymers, although we may also use any alkali metal or ammonium salt or the acid form.

The anion associated with the cationic groups of the cationic polymer is preferably chloride; however, we may also use any monovalent anion.

Preferably, the cation associated with the anionic polymer and the anion associated with the cationic polymer should not form an insoluble precipitate.

A typical polysalt structure within the scope of our invention would appear diagrammatically as follows:

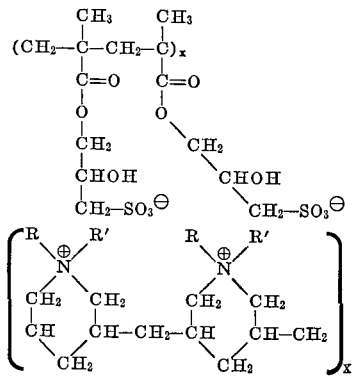

R and R' represent alkyl groups in this illustration, and $x$ is at least 100.

Of course it is not expected that all charge sites from one polymer chain will be ionically cross-linked with all charge sites from the same oppositely charged polymer chain. A preferred polysalt composition may be illustrated with a single link, as follows:

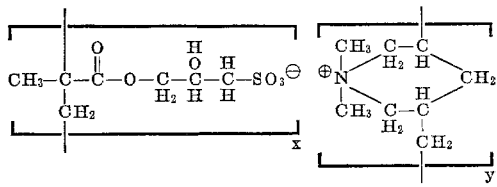

X and Y are independently at least 100—that is, the anionic and cationic polymers prior to formation into polysalts have at least 100 repeating units.

The following procedure is suggested for the preparation of a polysalt of poly (2 - hydroxy-3-methacrylyloxypropyl sulfonic acid, sodium salt) and poly (dimethyl diallyl ammonium chloride). The latter polymer, referred to hereinafter as PDMDAAC, may be made by the procedure disclosed by Butler in U.S. Patent 3,288,770.

Solutions of the two polymers are made in acetone and water as follows:

|  | Solution | |
|---|---|---|
|  | I | II |
| Water | 1,100 | 1,940 |
| Acetone | 2,750 | 3,000 |
| 2H3MOPSA | 100 | |
| PDMDAAC | | 100 |

The polymer is first dissolved in the water; the acetone is then blended in gradually as the water solution is stirred rapidly. The anionic polymer solution is then placed in a container accessible to a blender, and the cationic polymer solution is added to it as rapidly as possible. The polysalt composition will precipitate immediately into a rubbery mass. The excess acetone and water are removed and the polysalt mass is washed free of the non-complexed inorganic ingredients with water.

The polysalt complex may then be redispersed in acetone to about 5% solids, and spray dried to form a solid in usable physical form which may be used as an MVT agent for increased moisture vapor transmission when incorporated into a vinyl plastisol and cast into a film.

We do not intend to be restricted to the above strictly illustrative examples presented. Our invention may be otherwise practiced within the scope of the following claims.

We claim:
1. Ionically cross-linked polysalts wherein the anionic polymer thereof is selected from the group consisting of polymers of the formula

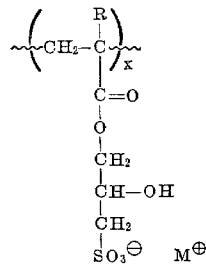

where R is selected from the group consisting of H, $CH_3$ and $C_2H_5$, $x$ is at least 100 and M is a monovalent cation, and wherein the cationic polymer is selected from the group consisting of polyvinyl pyridine quaternary ammonium polymers, polyvinyl benzyl trimethyl ammonium chloride, quaternized polyethylene amines, poly(dimethyl amino ethyl methacrylate quaternary ammonium compounds), poly(dimethyl diallyl ammonium chloride), poly(2-hydroxy-3-methacrylyloxypropyl trimethyl ammonium chloride), and poly(methyl dodecyl diallyl ammonium chloride).

2. A salt of (a) poly (dimethyl diallyl ammonium) and (b) poly (2-hydroxy-3-methacryloxypropyl sulfonate).

3. The reaction product of poly (dimethyl diallyl ammonium chloride) and poly (2-hydroxy-3-methacryloxypropyl sodium sulfonate).

References Cited

UNITED STATES PATENTS

| 3,467,604 | 9/1969 | Michaels | 260—874X |
| 3,271,496 | 9/1966 | Michaels | 260—874X |
| 2,964,557 | 12/1960 | Niederhauser et al. | 260—86.1X |
| 2,832,746 | 4/1958 | Jackson | 260—874X |

MURRAY TILLMAN, Primary Examiner

H. ROBERTS, Assistant Examiner

U.S. Cl. X.R.

210—22; 260—2, 29.6, 895